Dec. 16, 1969  H. B. NEWMAN ET AL  3,483,852
FLUID COUPLING FAN DRIVE
Filed Dec. 1, 1967

INVENTORS
HARRY B. NEWMAN
GEORGE W. WALKER
BY
ATTORNEYS

United States Patent Office 3,483,852
Patented Dec. 16, 1969

3,483,852
FLUID COUPLING FAN DRIVE
Harry B. Newman, Washington, and George W. Walker, Pekin, Ill., assignors to Caterpillar Tractor Co., Peoria, Ill., a corporation of California
Filed Dec. 1, 1967, Ser. No. 687,269
Int. Cl. F01p 7/04
U.S. Cl. 123—41.12                                3 Claims

ABSTRACT OF THE DISCLOSURE

A thermostatically controlled fluid coupling fan drive utilizing a centrifugal dump valve to prohibit the fan from exceeding a predetermined maximum speed and utilizing the engine lubricating system as the coupling medium. A valve responsive to the temperature of the engine coolant regulates the admission of lubricant to the coupling and thus the degree of torque transmitted to the fan. The valve, at all times, allows sufficient lubricant to pass for lubrication of the coupling.

---

Thermostatically controlled fluid couplings depend upon the temperature of a fluid such as oil, water, air, etc. to control fluid flow to the coupling which in turn determines the speed which the coupling turbine will have in proportion to the coupling impeller speed. In internal combustion engines, it is generally true that the fluid coupling and fan are designed to provide maximum cooling in the lower engine speed range. At maximum engine speed, fan speed becomes higher than necessary resulting in reduced fan efficiency, decreased available engine horsepower because of the extra energy required to drive the fan, unnecessary fan noise, and sand blasting of the radiator core; any or all of these undersirable effects may occur in a given engine application.

It is therefore an object of the present invention to provide a fluid coupling fan drive which obviates each and every one of the above descried undesirable conditions.

It is also an object of the present invention to provide a fluid coupling fan drive wherein the fan may be operated at a desired optimum speed at reduced engine speed while preventing fan overspeed at maximum engine speed.

It is a further object of the present invention to provide a fluid coupling fan drive wherein the fan and coupling may be designed so that maximum fan speed and cooling can be achieved under adverse conditions within the desired engine speed range.

It is a further object of the present invention to provide a fluid coupling fan drive wherein, at high engine speeds, the fan may be turned more slowly than the engine, thereby requiring less energy, while still providing satisfactory cooling.

It is also an object of the instant invention to provide a fluid coupling fan drive wherein a predetermined maximum fan speed regardless of engine speed, causes a reduction in sand blasting and abrasion of radiator cores and allows fan noises to be reduced while still providing proper cooling.

Other objects and advantages of the invention will become apparent to those skilled in the art upon reading of the following description when viewed with the accompanying drawing.

Figure 1:
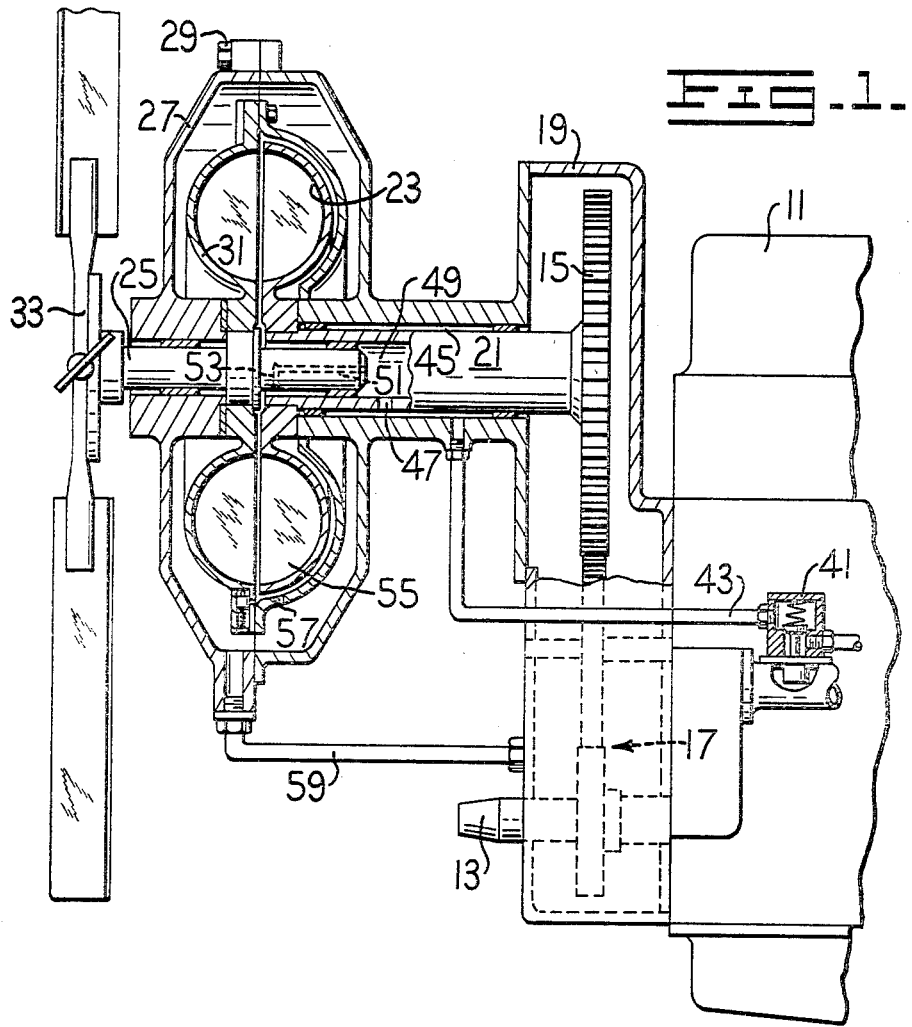
FIG. 1 is a side view, partly in vertical section, of an engine coupling and fan according to the present invention.

Referring now to the drawing in greater detail, there is shown in FIG. 1 an internal combustion engine 11 from which a crankshaft 13 drives a gear 15 through suitable gearing 17. Gear 15 is mounted in a housing 19 upon a shaft 21 to the opposite end of which a coupling impeller 23 is attached.

A shaft 25 is mounted coaxially with shaft 21 in a housing 27 which is attached to housing 19 by means such as bolts 29. A coupling turbine assembly 31 is mounted on the end of shaft 25 within housing 27 and a cooling fan 33 is mounted on the external end thereof.

A thermostatic valve 41 is mounted on the engine in such a way as to receive oil therefrom while measuring the temperature of the engine coolant—either water or oil. In its closed position, the valve allows the passage of enough oil to provide proper lubrication of the coupling assembly. Upon passing through the valve 41, oil moves through passage 43 and into a cylindrical area 45 between housing 19 and shaft 21. Next, the oil passes through opening 47 in the shaft 21 and into chamber 49 in the center of shaft 21. From chamber 49, the fluid passes into passage 51 and orifice 53 and thence into chamber 55 formed by impeller 23 and turbine 31. The oil then returns to the lubricating system through orifice 57 and passage 59, thus lubricating the coupling while not allowing a heat buildup therein.

As the engine coolant temperature rises, valve 41 opens, allowing a greater amount of oil to flow through the coupling transfer system and into chamber 55. As the chamber is filled with oil, a fluid coupling is effected between impeller 23 and turbine 31, causing rotation of the cooling fan 33. A small amount of oil will continue to flow through orifice 57, thereby allowing a cooling of the coupling but it will be insufficient to disturb the coupling effect between the turbine and impeller.

Figure 2:
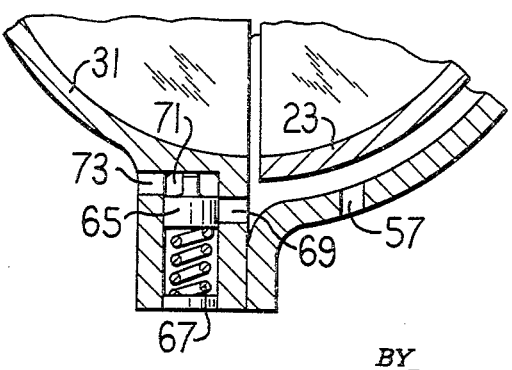
FIG. 2 shows an enlarged view of that portion of FIG. 1 embodying a centrifugally actuated dump valve in the fluid coupling.

At a predetermined speed of the turbine, valve 65, as shown in FIG. 2, will be moved outwardly by centrifugal force against the preload of a spring 67. Oil in chamber 55 is then allowed to flow through a passage 69, valve chamber 71, orifice 73, and thence through passage 59 to return to the main lubricating system.

Predetermination of the rotational speed at which valve 65 will allow passage of the oil, and proper design of the orifices, etc. will fix a speed at which just enough oil passes through the valve to maintain a constant oil level in the fluid coupling. This will provide a constant speed of rotation of the cooling fan.

As air moved by the cooling fan passes over the engine, the coolant temperature will be decreased. As the temperature decreases, valve 41 will return to its closed position and oil will continue to be drained past valve 65. Since oil will now be drained from the coupling without being replenished, the coupling effect of the impeller and turbine will be diminished and the fan speed will be reduced. This reduction in speed allows the biasing force of spring 67 to overcome the centrifugal force exerted on valve 65 and return the valve to such a position that orifice 69 becomes closed. This of course cuts off the drainage of oil past the valve. The remaining oil in the coupling will continue to flow through orifice 57, reducing fan speed still further, until such time as the orifice is once again performing only a cooling function.

In this manner, applicants have provided a fluid coupling fan drive utilizing the well known advantages of a fluid coupling while providing a means for insuring that the fan is not driven at a speed greater than a desired, predetermined speed.

We claim:
1. In an internal combustion engine, an engine cooling system employing a liquid coolant,
   a fan for cooling the engine coolant,
   a fluid coupling having
      an impeller driven by the engine,
      a turbine fixed to the fan,
      means mounting the impeller and turbine in a fixed axial relationship; and
      means allowing the flow of lubricating fluid from the coupling at all times during operation of the engine,
   fluid passage means connecting the engine lubricating system and the fluid coupling,
   a valve in the fluid passage means normally opened a predetermined amount sufficient to pass a volume of engine lubricant therethrough for lubrication of the fluid coupling but insufficient for transmittal of torque from the impeller to the turbine,
   means for opening the valve to an extent, greater than the predetermined amount, in proportion to the temperature of the liquid coolant, thereby causing transmittal of torque from the impeller to the turbine in direct relation to the liquid coolant temperature, and
   means in the fluid coupling for limiting the turbine speed, and thus the fan speed, to a predetermined maximum speed.

2. The cooling system of claim 1 wherein
   the means for controlling the maximum fan speed comprises
   a centrifugally actuatable valve which controls the volume of fluid in the coupling in accordance with the speed of turbine.

3. The cooling system of claim 2 wherein
   the means for controlling the maximum fan speed further comprises
   a biasing means acting upon the centrifugally actuatable valve to close it when the turbine speed is less than the predetermined maximum speed.

References Cited

UNITED STATES PATENTS

| | | | |
|---|---|---|---|
| 2,096,070 | 10/1937 | Sinclair | 192—103 X |
| 2,802,459 | 8/1957 | Herbenar | 123—41.12 |
| 2,808,817 | 10/1957 | Graham et al. | 123—41.12 |
| 2,855,909 | 10/1958 | Stefan | 123—41.12 |
| 3,033,334 | 5/1962 | Herbenar | 192—103 X |
| 3,144,922 | 8/1964 | Weir. | |
| 3,159,254 | 12/1964 | Weir. | |

AL LAWRENCE SMITH, Primary Examiner

U.S. Cl. X.R.

60—54; 192—103